US 6,467,390 B1

(12) United States Patent
Harth et al.

(10) Patent No.: US 6,467,390 B1
(45) Date of Patent: Oct. 22, 2002

(54) BRAKE FORCE BOOSTER WITH A PANIC BRAKING FUNCTION

(75) Inventors: Ralf Harth, Darmstadt; Holger Von Hayn, Bad Vilbel; Jürgen Schonlau, Walluf; Wolfgang Ritter, Oberursellis; Hans-Jörg Feigel, Rosbach; Steffen Linkenbach, Eschborn, all of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/700,477

(22) PCT Filed: Apr. 29, 1999

(86) PCT No.: PCT/EP99/02912

§ 371 (c)(1),
(2), (4) Date: Mar. 7, 2001

(87) PCT Pub. No.: WO99/59854

PCT Pub. Date: Apr. 29, 1999

(30) Foreign Application Priority Data

May 15, 1998 (DE) .......................................... 198 21 795
Jan. 25, 1999 (DE) .......................................... 199 02 710

(51) Int. Cl.$^7$ ................................................. F15B 9/10
(52) U.S. Cl. ..................................... 91/369.2; 91/376 R
(58) Field of Search ........................... 91/369.2, 369.3, 91/376 R; 60/582; 188/356; 303/114.3

(56) References Cited

U.S. PATENT DOCUMENTS 5,249,651 A    10/1993   Gautier et al.
5,645,145 A  *  7/1997   Ikeda ........................ 188/356

FOREIGN PATENT DOCUMENTS

| DE | 41 27 000 | 2/1993 |
| DE | 44 05 092 | 12/1994 |
| GB | 2 054 777 | 2/1981 |
| JP | 08318846 | 12/1996 |
| JP | 09175373 | 7/1997 |
| JP | 10086812 | 4/1998 |
| WO | 94 00325 | 1/1994 |
| WO | 99 17968 | 4/1999 |

OTHER PUBLICATIONS

Search Report of the German Patent Office for Application No. 199 02 710.2.
Search Report of the German Patent Office for Application No. 198 21 795.1.

* cited by examiner

Primary Examiner—Edward K. Look
Assistant Examiner—Thomas E. Lazo
(74) Attorney, Agent, or Firm—Rader, Fishman & Grauer PLLC

(57) ABSTRACT

The present invention relates to a brake force booster with a panic braking function for automotive vehicles. The present invention includes that the first sealing seat arranged movably in relation to the control housing wherein the sealing seat is fixed to a lever such that when a predetermined relative displacement between valve piston and control housing is exceeded so that the lever prevents at least a movement of the sealing seat in the actuating direction. The brake force booster with a brake assist function is easy to manufacture and, in addition, ensures a controllability of the brake force in the emergency braking position.

14 Claims, 5 Drawing Sheets

BRAKE FORCE BOOSTER WITH A PANIC BRAKING FUNCTION

TECHNICAL FIELD

The present invention generally relates to vehicle brake systems and more particularly relates to a brake force booster with a panic braking function for automotive vehicles.

BACKGROUND OF THE INVENTION

A brake force booster of this general type is disclosed in U.S. Pat. No. 5,645,145. During actuation, the valve piston of the prior art brake force booster interacts with a hydraulic piston which defines a first hydraulic chamber along with a force output member or a push rod. On the side of the hydraulic piston remote from the first chamber, there is a second hydraulic chamber which is connected to the first chamber by way of a plurality of channels, and the connection is closable by means of a valve assembly. A second hydraulic piston or annular piston is axially supported on the hydraulic piston, under the preload of a compression spring, the said piston permitting displacement of the fluid volume from the second chamber into the first chamber. Consequently, the described arrangement represents a hydraulic reaction device. The above-mentioned valve assembly is preferably configured so that it remains closed during 'normal' operation so that a transmission of the actuating force introduced at the valve piston and of the boosting force raised by the brake force booster occurs by means of the fluid volume enclosed in the first chamber. When a rapid actuation takes place, which is e.g. due to panic braking or emergency braking, the valve assembly remains open so that the fluid is displaced from the first chamber into the second chamber and the valve piston that is supported on the first hydraulic piston can cover a longer actuating travel, which causes an increase of the slot between the second sealing seat and a valve member and, thus, a quicker ventilation of the ventilatable working chamber of the prior art brake force booster.

The state of the art brake force booster especially suffers from the disadvantage of the complicated design of the mentioned means or the reaction device, whose chambers must be sealed by means of sealing elements which cause an increase of the friction developing in the system and, further, represent a potential source of disturbance. Further problems are involved with filling the hydraulic chamber with liquid pressure fluid, which is in particular inappropriate for large-scale production.

An object of the present invention is to disclose provisions which increase the reliability in operation and extend the useful life of the brake force booster. Another objective is to permit manufacture of the brake force booster disclosed by reasonable efforts.

According to the present invention, this object is achieved because the first sealing seat is arranged movably in relation to the control housing, and there is provision of a means by which the sealing seat can be fixed in position when a predetermined relative displacement between the valve piston and the control housing is exceeded so that the means permits a movement of the sealing seat in opposition to the actuating direction relative to the control housing. Consequently, decrease of the slot at the second sealing seat, the so-called poppet valve, which could be caused by movement of the sealing seat in the actuating direction is prevented.

To specify the idea of the present invention, it is provided that the first sealing seat is supported indirectly or directly on a reaction disc when the predetermined relative displacement between the valve piston and the control housing is exceeded. Thus, in the actuated condition, the deformation of the reaction disc causes the sealing seat to lift from its stop that is active in the actuating direction, and namely in opposition to the forces of a resetting spring.

In a preferred aspect of the present invention, a sleeve is associated with the valve piston in a way axially displaceable in relation thereto, the said sleeve including a stop as mentioned above, and the sealing seat, due to abutment on the stop, is supported on the reaction disc by means of the sleeve.

DETAILED DESCRIPTION OF THE PREFERRED EMBODIMENTS

Figure 1:
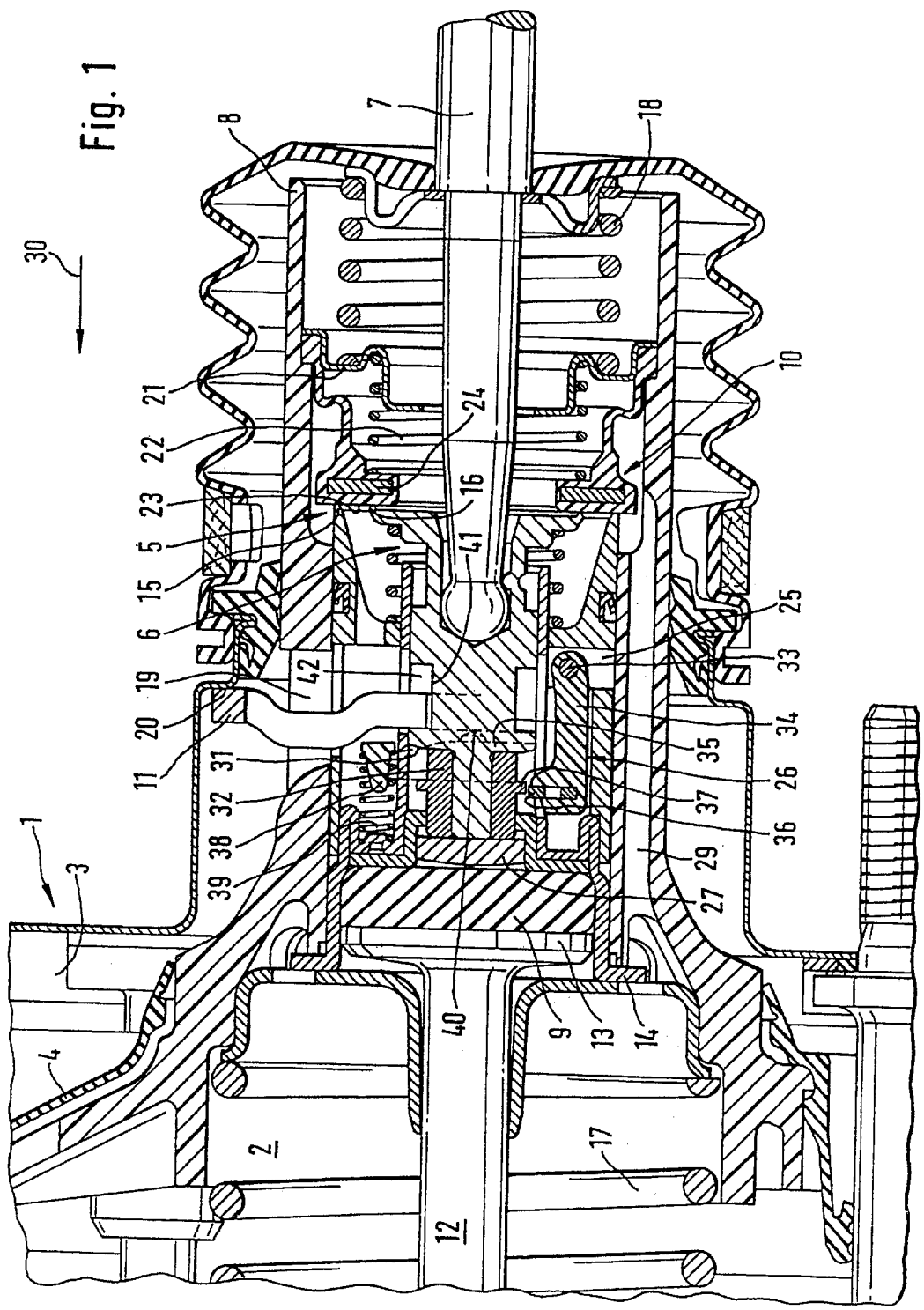
FIG. 1 is an enlarged cross-sectional view, partly broken away, of the brake force booster of the present invention in the inactive ready position.

The booster housing 1 (shown only schematically) of the vacuum brake force booster of the present invention, as illustrated in the drawings, is subdivided into a first chamber 2 (vacuum chamber) and a second chamber 3 (working chamber) by an axially movable wall. The axially movable wall (not shown) is comprised of a diaphragm plate and a flexible diaphragm 4 which abuts thereon (indicated only in part) and is configured as a rolling diaphragm to provide a sealing between the outside periphery of the diaphragm plate and the booster housing 1 (not shown in detail).

A control valve 5 operable by an actuating rod 7 is accommodated in a control housing 8, that is sealed and guided in the booster housing 1 and carries the movable wall, the said control valve having a first sealing seat 15 which is movable axially relative to the control housing 8 and is guided therein. In addition, the actuating rod 7 is rigidly connected to a valve piston 6 on which a second sealing seat 16 is provided. Further, the valve assembly comprises a valve member 10 which cooperates with both sealing seats 15, 16 and is sealedly arranged in the control housing 8, the said valve member being urged against the valve seats 15, 16 by means of a valve spring 22 supported on a bottom 21. The working chamber 3 is connectable to the vacuum chamber 2 by way of a channel 29 that extends laterally in the control housing 8.

By way of a rubber-elastic reaction disc 9 that abuts frontally on a front part 14 of the control housing 8, and a push rod 12 that has a head flange 13, the brake force is transmitted to an actuating piston of a (non-illustrated) master cylinder of the brake system which is fitted to the vacuum-side booster housing half. A central opening in the front part 14 serves for the passage of a pressure member with a preferably conical pressure surface so that the driver can boost the effect of force, produced by the pressure difference by way of the front part, by additionally applying the pressure member which is movable into abutment on the front side of the valve piston 6.

A resetting spring 17, shown schematically in the drawing, which is supported on the vacuum-side end wall of the booster housing 1 retains the movable wall in the initial position shown. There is further provision of a second compression spring or piston rod return spring 18 which is supported indirectly on the actuating rod 7, on the one hand, and on the bottom 21, on the other hand, and the force of which ensures a bias of the valve piston 6 or its sealing seat 16 in relation to the valve member 10.

To connect the working chamber 3 to the atmosphere when the control valve 5 is actuated, a channel 19 which extends roughly radially is still designed in the control housing 8. The return movement of the valve piston 6 at the end of a braking operation is limited by a transverse member 11 which bears against a stop 20 provided in the booster housing 1 in the ready position of the vacuum brake force booster shown in FIG. 1.

As can further be taken from the drawings, the valve member 10 includes an annular sealing surface 23 which cooperates with the two sealing seats 15, 16. Sealing surface 23 is reinforced by means a metal reinforcing disc 24 and includes a number of axial passages for pressure compensation. For pressure compensation purposes, a guide member, instead of the bottom 21, may be provided in which the valve member 10 is guided and movable, sealed by sealing lips, so that a pressure-balanced pneumatic chamber for the valve member 10 is produced inside the control housing 8. EP 655 039 A1 is referred to in full extent as far as this modification is concerned. This arrangement consequently permits a reduction of the difference between the response force of the brake force booster and the resetting force acting on the valve piston to the end that with a constant response force, an increase of the resetting force is possible, or a reduction of the response force is possible with a constant resetting force.

Figure 2:
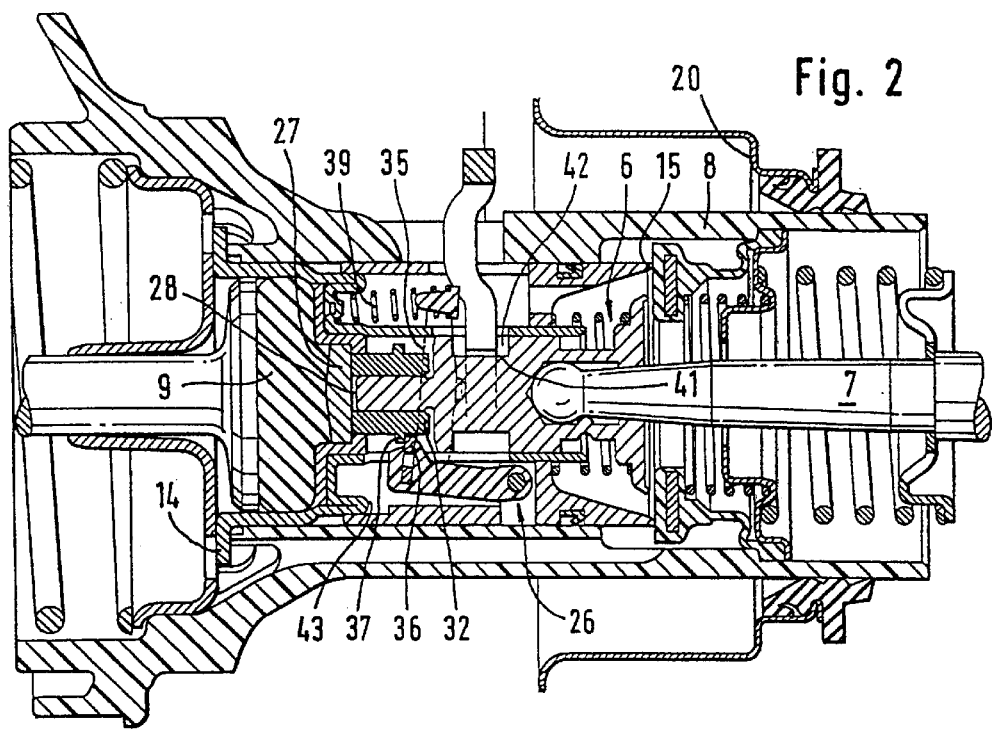
FIG. 2 shows the control assembly of the brake force booster according to FIG. 1 in an active emergency braking position (panic braking position).
Figure 3:
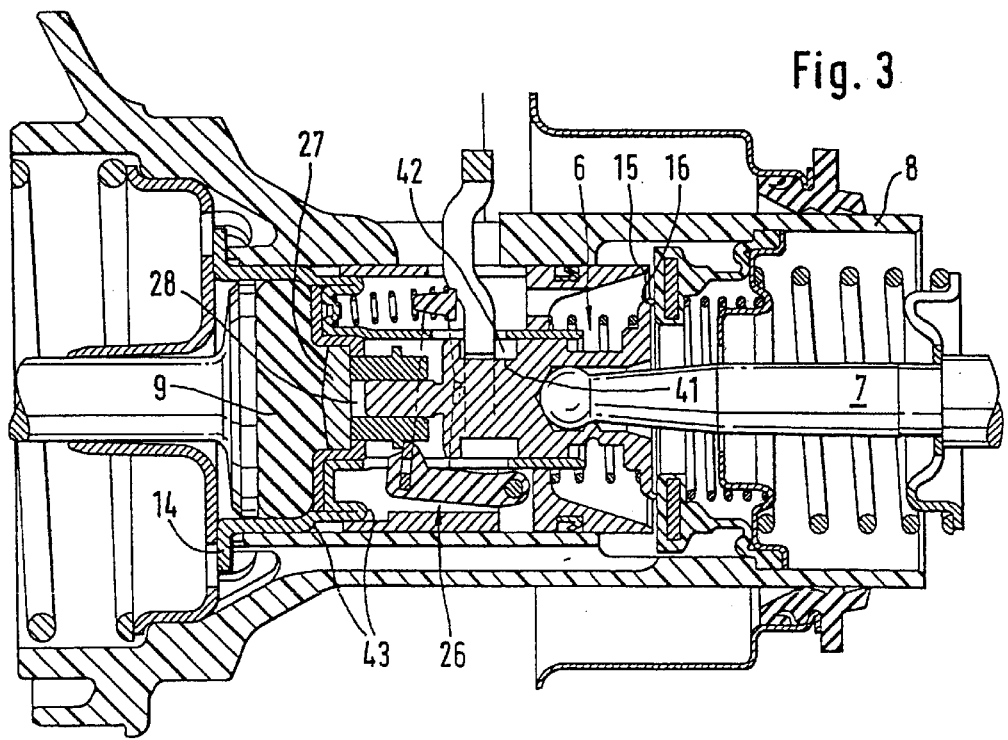
FIG. 3 is a view of the control assembly shown in FIG. 2 in a return stroke position, i.e., after removal of the actuating force.

As can further be clearly seen in FIG. 1, a means 26 is associated with the sealing seat 15 and permits determining said's position when a predefined relative displacement between valve piston 6 and control housing 8 is exceeded. For this purpose, the valve piston 6 on the end close to the reaction disc has a sleeve 32 which is displaceable coaxially relative to the valve piston 6 and movable into abutment on a shoulder 31 close to the valve piston. Upon actuation, sleeve 32 along with the piston 6 is displaced in the direction of the pressure member 27. Sleeve 32 is provided with a stop 36 on which means 26 can engage with a projection 36, as can be seen in FIGS. 2 and 3. According to the said embodiment, a lever is used as the means which is swivellably articulated at the sealing seat 15 or a base member 25 that carries the sealing seat by means of a knife-edge support or a pin 33. The lever has the shape of an L, when viewed from the side, and includes a first leg 34 and a second leg 35 (hinted at). A projection 36 is arranged on the second leg 35 for engagement on stop 37 of sleeve 32. In addition, a tongue 38 is arranged at the end of the second leg 35 and extends into a compression spring 39. Compression spring 39 permanently acts upon the means 26 in the clockwise direction.

Consequently, the leg 35 with an attachment 40 arranged on its rear side tends to move into abutment on the transverse member 11.

Ventilation of the working chamber 3 is effected in the emergency braking position, when a predetermined relative displacement between valve piston 6 and control housing 8 is exceeded, whereby the reaction disc 9 is acted upon by the front part 14 and compressed elastically due to the effect of the control housing 8. Simultaneously, a balance of forces develops at the pressure surface of the pressure member 27, with the driver being completely released from reactions due to the clearance 28 between the front part of the valve piston and the pressure member 27. Under the effect of the compression spring 39, the leg 35 tends to perform a rotation in the clockwise direction and backgrips with its projection 36 the stop 37 of the sleeve 32 so that the sealing seat 15 is supported on the reaction disc 9 by way of the means 26 and the sleeve 32 as well as the pressure member 27. The tilting movement of the means 26 is permitted because the transverse member 11 in the course of the actuating movement is released from the stop 20 on the housing, on the one hand, and has a clearance 42 within an indentation 41 close to the valve piston, on the other hand. In the panic braking position, the valve seat 15 is displaceable relative to the control housing 8 only in opposition to the actuating direction. Consequently, reduction of the slot at the sealing seat 16 is prevented. As can be described in the following, the brake force can be increased until the maximum brake effect without the driver feeling any reactions of the brake system. This means that the maximum boosting force of the booster can be produced even with a minimum input force, and the result is a transmission ratio which is increased compared to the normal braking function.

Figure 4:
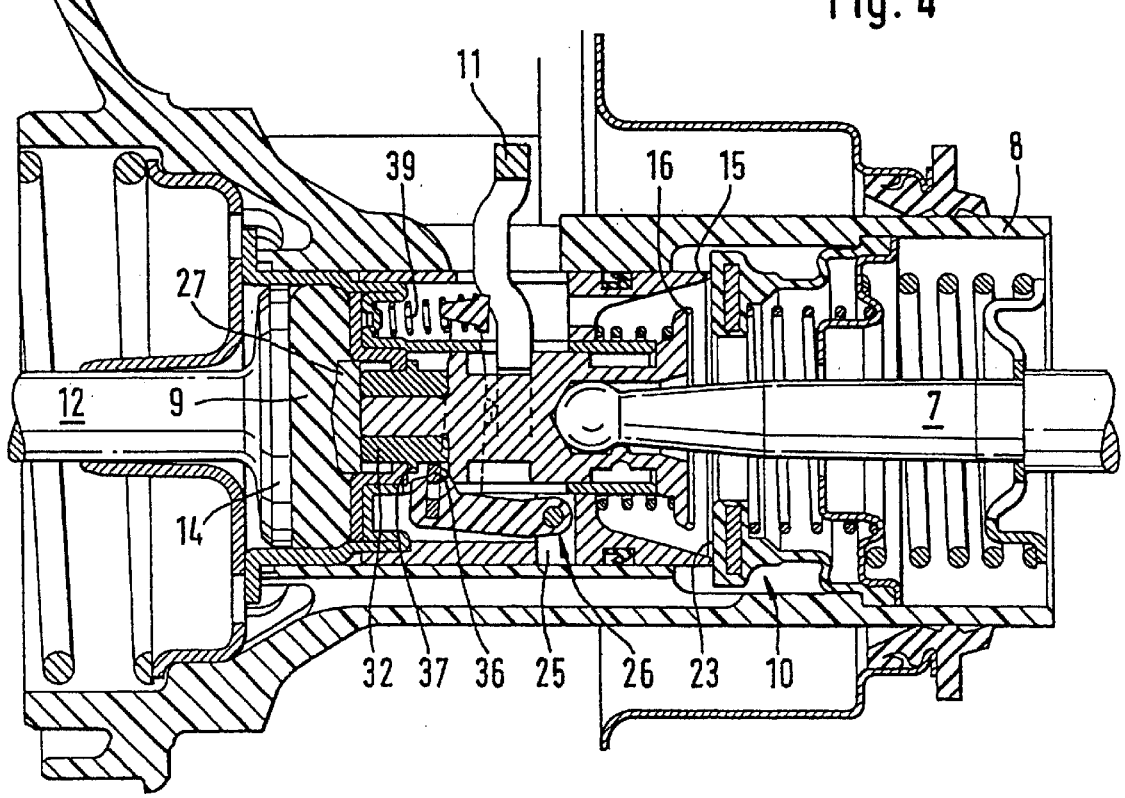
FIG. 4 is a view of the control assembly of the brake force booster according to FIG. 1 in the brake's fully applied position (maximum force).

It can be taken from FIG. 4 that the output force of the b rake force booster may even be increased by the addition of pedal force, with the pressure member 27 entering the reaction disc 9 and the second sealing seat 16 being lifted to a major extent for a particularly quick ventilation of the working chamber 3. In doing so, the base member 25 of the sealing seat 15 moves to abut on the front part 14 of the control housing under the effect of springs. Of course, this action is not free from reactions.

A basic aspect is the control of the brake force generated after a panic actuation because it is a major shortcoming of electrically operating panic braking aids (brake assist systems) of the art that these operate according to the on-off principle. More specifically, the boosting force of these prior art devices in the panic braking position is uncontrollable or controllable only with a maximum expenditure in electronics because the brake force booster directly reaches the range of maximum attainable boosting force and this condition can be interrupted only by complete release and related omission of the brake assist function.

FIG. 3 illustrates the action for reducing the boosting force generated in the emergency braking position. Starting from the position shown in FIG. 2, the valve piston 6 is retracted to the right by withdrawing the actuating pedal (not shown), and the clearance 28 close to the reaction disc is increased and, simultaneously, the slot at the second sealing seat 16 is closed. Because ventilation of the working chamber 3 does not occur, on the one hand, and there is a connection to the vacuum chamber 2 by way of the channels 19, 29, on the other hand, evacuation of the working chamber 3 and, to the same extent, reduction of the boosting force will also occur.

It is likewise possible in the panic braking position to terminate the force reduction by depressing the brake pedal, with the result of displacement of the valve piston 6 to the left, whereby the first sealing seat 15 closes and the second sealing seat 16 opens so that a corresponding servo force develops.

Starting from the panic braking position, the device is moved into the ready position as follows. Because a low amount of brake force or no brake force is desired, the valve piston 6 is retracted until the transverse member 11 bears against the stop 20 on the housing. The sealing seats 15, 16 a re closed simultaneously so that evacuation of the first an d second chamber 2, 3 occurs. This causes a movement of the diaphram 4 together with the control housing 8 to the right, and the base member 25 is also urged to the right by abutment on an edge 43 provided at the front part 14 in opposition to the spring fores. At a defined point of time, the back side of the leg 35 with an attachment 40 abuts on the transverse member 11 and, with the return movement proceeding, there is a counterclockwise tilting movement of the means 26, with the projection 36 being swivelled out of engagement relative to stop 37. This consequently removes the panic braking position along with the related axial support of the first sealing seat 15, and the brake force booster is available for the normal braking function or repeated panic braking functions.

According to a modified embodiment (not shown), it is also possible to terminate the panic braking function so that the pressure applied to the pedal is suddenly decreased only so far that the decrease will not cause a complete return movement of the control housing 8 in the above-described ready position but merely causes a limited withdrawal movement of the valve piston 6 relative to the control housing 8. In this embodiment, the means 26 is configured so that it becomes ineffective during a predetermined relative displacement between the valve piston 6 and the control housing 8, that means, it detaches the fixation in opposition to the actuating direction. This safeguards the movability of the valve seat 15 again so that the panic braking function is eliminated.

Figure 5:
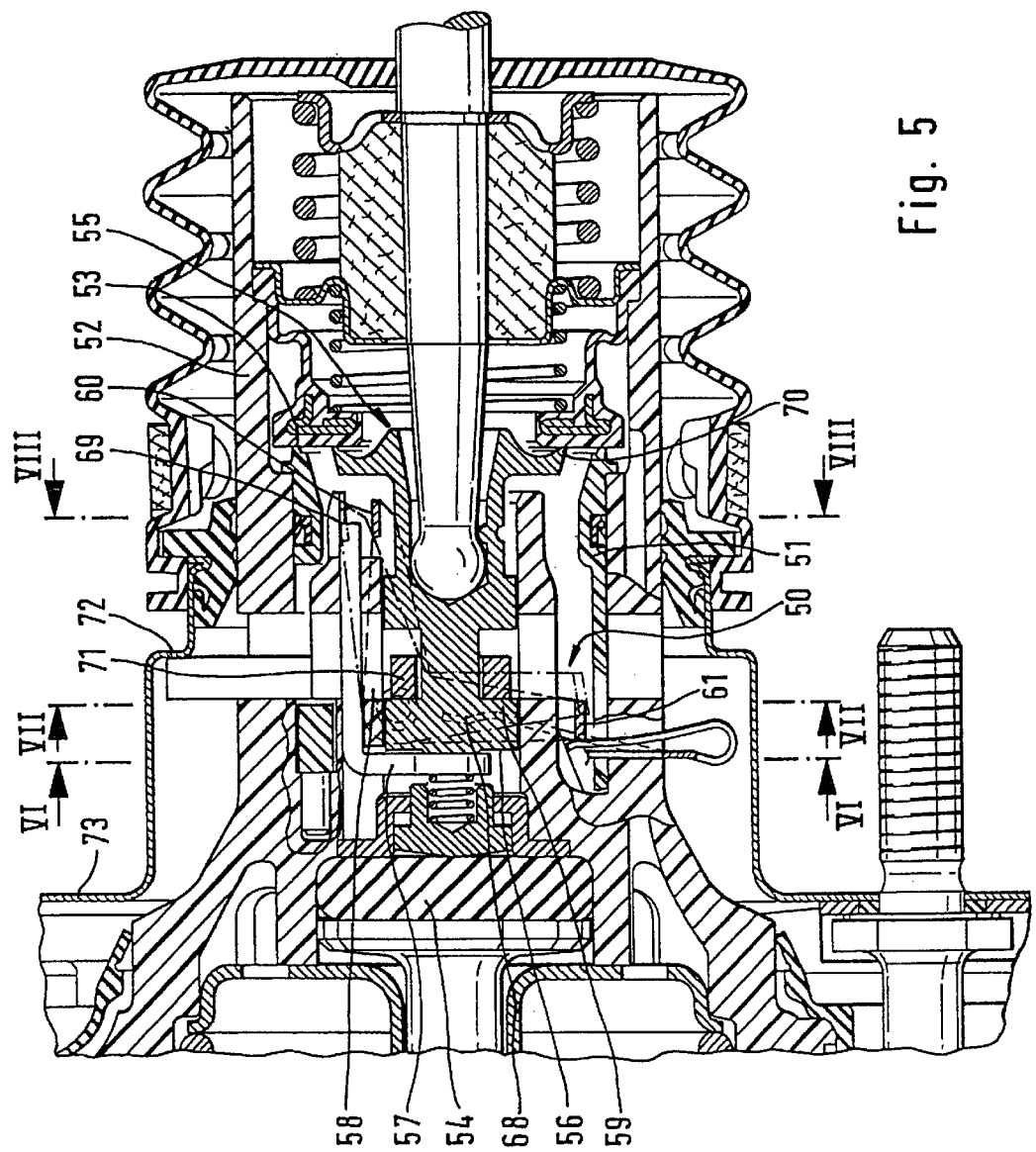
FIG. 5 is a cross-sectional view, as in FIG. 1, of a second embodiment of the present invention.
Figure 6:
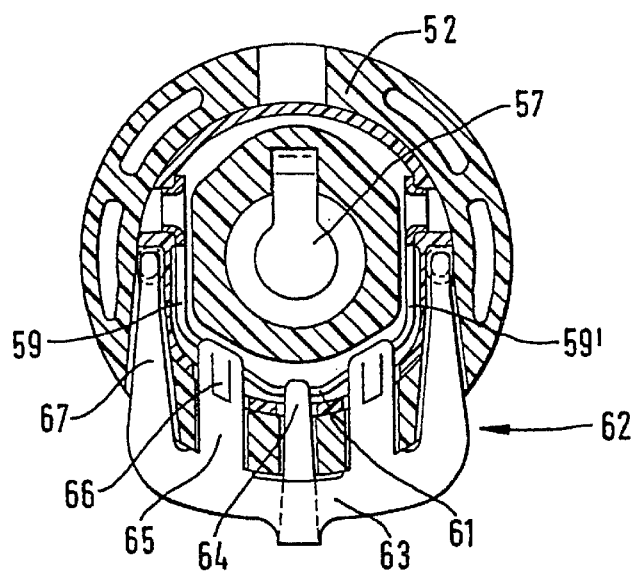
FIG. 6 is a cross-section taken along line VI—VI in FIG. 5.
Figure 7:
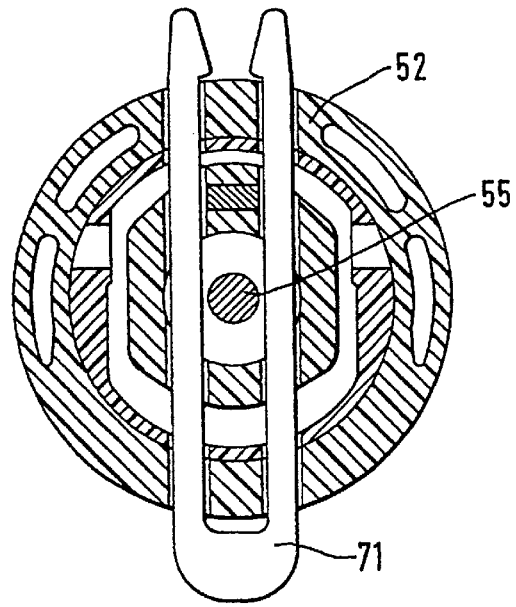
FIG. 7 is a cross-section taken along line VII—VII in FIG. 5.
Figure 8:
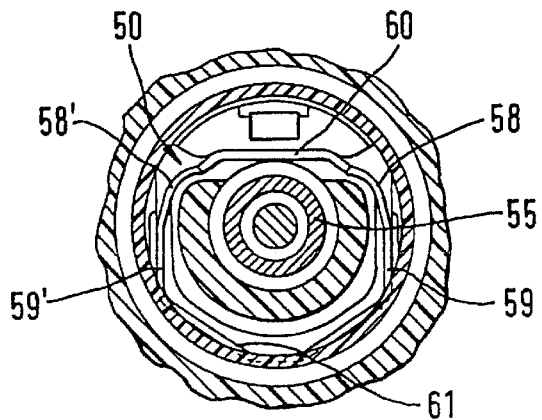
FIG. 8 is a cross-section as in FIG. 7, taken along line VIII—VIII in FIG. 5.

A modified embodiment is apparent from FIG. 5 which, in conformity with the preceding Figures, includes as a supporting means a tiltable and L-shaped lever 50 which is articulated at a base member 51 of a first sealing seat 53 that is principally axially movable in a control housing 52. For an anti-friction guide that is locked against rotation, the base member 51 includes cylindrical pins by which it engages in corresponding bores of the control housing. The axial support of the sealing seat 53 is carried out indirectly on a reaction disc 54. As an intermediate component, there is provision of a locking member 57 which bears against a front side 56 of the valve piston and is displaceable with it, rather than a sleeve slidable on the valve piston 55 as in the device described hereinabove. The locking member 57 adopts the same function as the sleeve and involves the advantage that it has larger dimensions (compared to the mentioned sleeve) so that the monitoring of dimensions and tolerance rating of very small dimensions is not necessary. Further, no friction appears (slip-stick effects). In FIG. 5, the lever 50 is shown in dotted lines in its (non-swivelled) normal braking position. The snapped-in or engaged panic braking position of the lever 50 is characterized in dash-dot lines. As becomes apparent also in connection with FIGS. 6, 7, and 8, the lever 50 has two, opposed pairs of legs 58, 58', 59, 59' offset in the shape of an L (roughly at right angles), which are interconnected at their leg ends by a yoke 60, 61, respectively. Yoke 60 which interconnects the two first legs 58, 58' serves for locking on the locking member 57 (in the panic braking position), and an elastically biased spring element 62 abuts on the yoke 61 that interconnects the two second legs 59, 59' in such a manner that the lever 50 permanently tends to perform a counterclockwise tilting movement about its bearing axis (in FIG. 5). Besides, this second yoke 61 is used for the release action, as will be described in the following. The tiltable support of the lever 50 is done by means of two aligning bearing eyes which engage in recesses in the base member 51 and this way form the bearing axis. According to the embodiment, the spring element 62 has a largely flat design and includes several resilient legs which are arranged in one piece on a transverse beam 63. The legs are arranged on the transverse beam from radially inwards in an outward direction as follows. A first (centric) leg 64 is used to apply the mentioned counterclockwise biassing force to the lever 50. Two second legs 65 extend through recesses in the control housing 52 and have each one deflected catch 66 for fixation in the control housing 52. Two third legs 67 bear resiliently against a front side 68 of the base member 51 so that there is an elastic bias in opposition to the actuating direction also in this respect. It is an advantage in this respect that the flat spring element 62 not only requires extremely little space in an axial direction so that mounting space is economized. In addition, spring element 62 assumes a number of tasks and functions which usually must be fulfilled by other separate spring elements. For a well defined safe locking in the panic braking position, it is advisable that the locking member 57 be provided with a catch-type shoulder 69 or a catch-type step which the yoke 60 can backgrip in a sufficient relative displacement between the valve piston 55 and the base member 51 in such a fashion that displacement of the first valve seat 53 in the direction of the reaction disc 54 is no longer possible. More specifically, the valve piston position is fixed in relation to the respective sealing seats in the moment of locking such that decrease of the slot at the second sealing seat 70 is prevented. A one-time quick activation connected with a corresponding displacement of the valve piston 55 relative to the control housing 52 will thus lead to the full boosting force. This action is irrespective of whether the driver is pushed back to a certain degree by the reaction force (recedes in the course of braking), or without receding keeps his/her foot on the brake, with the pedal force being increased accordingly.

To remove the locking position, the operator withdraws the valve piston 55 (can be pushed back) until the working chamber is evacuated again by closure of the second valve seat 7 (control valve) and opening of the first valve seat 53, and the control housing 52 follows the withdrawal movement of the valve piston 55. When now the wedge 71 which is offset by 90° in FIG. 7 moves into abutment on a stop 72 on a housing shell 73, and the base member 51 is also urged back under the spring effect of the third legs 67, the second yoke 61 will come to abut on an end face of the wedge 71 fixed in position on the housing. The lever 50 will tilt back clockwise into the release position due to the fixed abutment of the yoke 61 on wedge 71 and the return movement of the control housing 52 along with the base member 51 in opposition to the actuating direction.

What is claimed is:
1. Brake force booster with a panic braking function for automotive vehicles, comprising:
   a booster housing, the inside of which is subdivided by a movable wall into a first chamber and a second chamber,
   a control housing wherein a control valve is arranged which controls a pneumatic pressure difference that acts upon the movable wall and is operable by means of an actuating rod, wherein the control valve includes a first sealing seat, a second sealing seat provided on a valve piston as well as an elastic valve member that interacts with both sealing seats, a means for ensuring an abrupt rise of the boosting force raised by the brake force booster when the control valve is activated quickly, the first sealing seat is arranged movably in relation to the control housing, and a means for fixing the sealing seat in position when a predetermined relative displacement between valve piston and control housing is exceeded such that the means permits a movement of the sealing seat in opposition to the actuating direction relative to the control housing.

2. Brake force booster as claimed in claim 1, wherein the first sealing seat is supported indirectly or directly on a reaction disc when the predetermined relative displacement between the valve piston and the control housing is exceeded.

3. Brake force booster as claimed in claim 1, wherein the means is swivellably articulated at the first sealing seat and subjected to the effect of force of a spring element so that the means abuts resiliently on a control contour close to the valve piston or abuts resiliently on a transverse member, and in that the means abuts on a stop when the predetermined relative displacement is exceeded.

4. Brake force booster as claimed in claim 1, wherein the sealing seat is arranged on a sleeve-shaped base member which includes a cylindrical socket, and in that guide surfaces are provided on the base member or on the socket for the axially movable guiding of the base member in the interior of the control housing.

5. Brake force booster as claimed in claim 4, wherein the means includes a lever which is swivellably articulated at the base member and is acted upon by an elastic spring element.

6. Brake force booster as claimed in claim 5, further including a locking member arranged between valve piston and reaction disc, and in that the lever is movable into abutment on the locking member so that decrease of the slot at the sealing seat cannot be effected.

7. Brake force booster as claimed in claim 6, wherein the lever has two opposed pairs of legs offset in the shape of an L.

8. Brake force booster as claimed in claim 7, wherein the leg ends are interconnected by a yoke.

9. Brake force booster as claimed in claim 6, wherein the locking member has the shape of an L with two legs, and in that a catch shoulder for positive engagement of the yoke is arranged at one of the legs.

10. Brake force booster as claimed in claim 5, further including plane spring element with a plurality of resilient legs.

11. Brake force booster as claimed in claim 10, wherein the legs of said spring element are arranged on a transverse beam from where they extend in one single direction, and in that at least part of the legs are provided redundantly.

12. Brake force booster as claimed in claim 1, further including a sleeve associated with the valve piston in an axially displaceable in relation thereto, wherein the sleeve includes a stop, and the sealing seat is supported on the reaction disc by means of the sleeve.

13. Brake force booster as claimed in claim 12, wherein the sleeve is provided with a control contour for the projection.

14. Brake force booster as claimed in claim 1, further including a second leg which is provided at an angle relative to a first leg, wherein the second leg is movable into abutment on a fixed point on the housing, in opposition to a spring force.

* * * * *